UNITED STATES PATENT OFFICE.

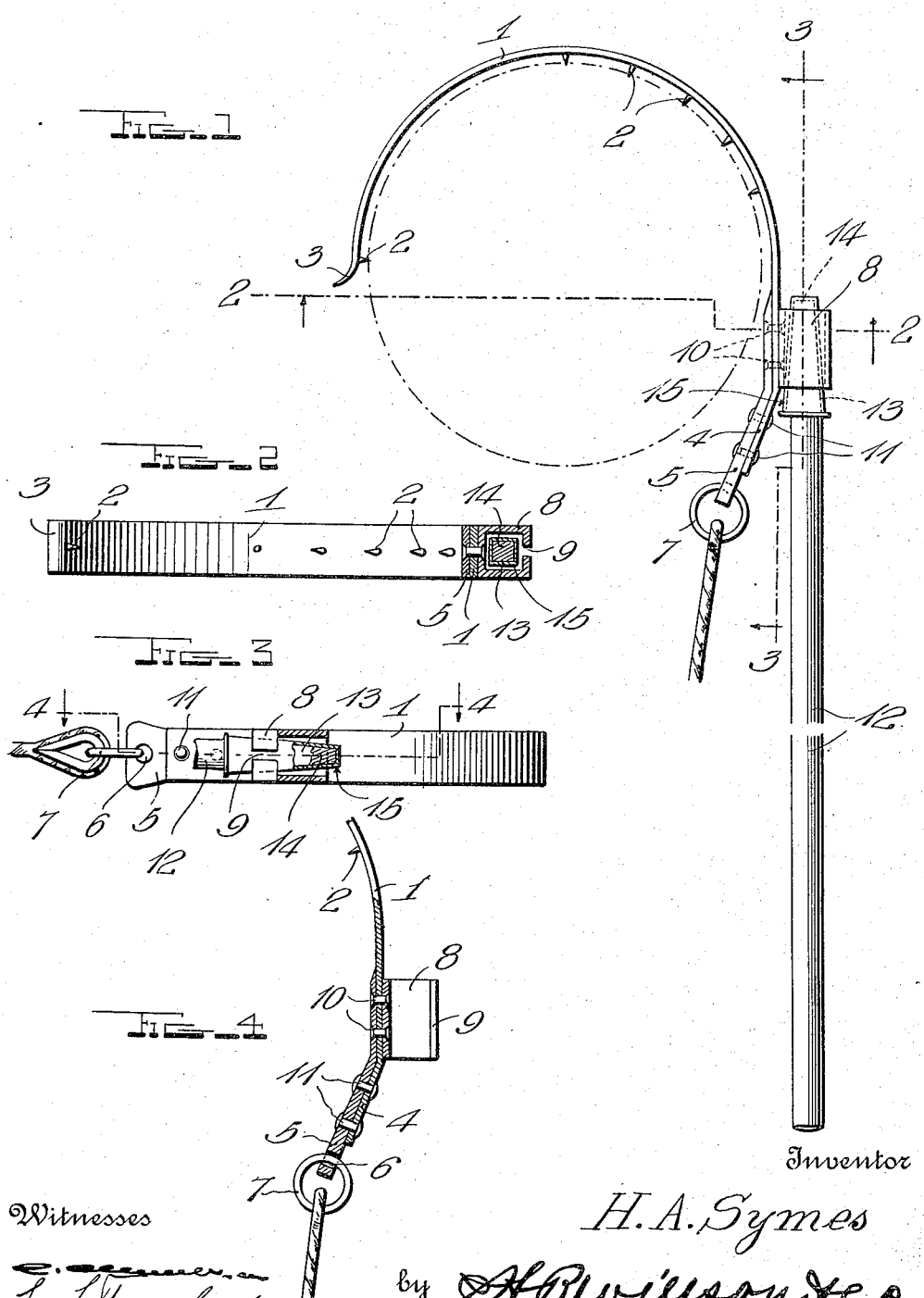

HARRY A. SYMES, OF PORTLAND, OREGON.

MOORING-HOOK.

1,168,126.  Specification of Letters Patent.  Patented Jan. 11, 1916.

Application filed June 14, 1915. Serial No. 34,060.

*To all whom it may concern:*

Be it known that I, HARRY A. SYMES, a citizen of the United States, residing at Portland, in the county of Multnomah and State of Oregon, have invented certain new and useful Improvements in Mooring-Hooks; and I do declare the following to be a full, clear, and exact description of the invention, such as will enable others skilled in the art to which it appertains to make and use the same.

This invention relates to new and useful improvements in grappling hooks and more particularly to mooring hooks, and the primary object of the invention is to provide an improved device of this character adapted to be used on all boats of moderate tonnage for the purpose of getting the first line fast quickly, when the boat is trying to effect a landing at a dock, or any other landing place.

Another object of the invention is to provide a mooring hook of this character having a detachable handle whereby the hook carrying the line may be quickly made fast to the dock and the handle easily detached therefrom while the line is being made fast.

A further object of the invention is to provide a device which is simple and durable in construction, inexpensive to manufacture, and one which will be very efficient in operation.

With these and numerous other objects in view my invention consists of certain novel features of construction, combination and arrangement of parts which will be herein referred to and more particularly pointed out in the specification and claims.

In the accompanying drawings: Figure 1 is a plan view, showing the device in use; Fig. 2 is a transverse section on the line 2—2 of Fig. 1; Fig. 3 is a similar view on the line 3—3 of Fig. 1; Fig. 4 is a horizontal section, taken on the line 4—4 of Fig. 3, with the holding pole removed from its socket.

In describing my invention I shall refer to the drawings in which similar reference characters designate corresponding parts throughout the several views and in which the numeral 1 designates a semi-circular hook 1 having a plurality of teeth 2 on its inner surface. The hook 1 has one end outturned as shown at 3, and the other turned inwardly as shown at 4, and the said inwardly turned end having attached thereto, against the inner surface of the hook 1 an angular extension 5. The outer end of the angular extension 5 is enlarged, and has therein an aperture 6 adapted to receive a ring 7 for the purpose of securing a rope to the said hook.

Adjacent the inturned end 4 of the hook 1 and held against the outer surface of the same is a rectangular shaped socket 8, having one of its sides split longitudinally as shown at 9 for a purpose to be hereinafter more fully described. The socket 8 and the inner end of the extension 5 are secured adjacent the inturned end 4 of the hook 1 by fasteners 10 adapted to hold the said members together. Additional securing means 11 are adapted to secure the inturned end of the hook 1 and the extension 5 in position.

A pole or handle 12 for the hook 1 has one of its ends squared as shown at 13, and the sides of said squared end 14 are converged or sloped toward the outer extremity for a purpose to be hereinafter more fully described. A metallic protecting cap 15 is provided for the sides of the squared end 13 of the handle or pole 12.

To assemble the parts of the said hook the pole or handle 12 has its squared end 13 inserted in the resilient socket 8 secured to the hook 1, and is adapted to be detachably held therein on account of the wedging action caused by the sloping sides 14 of said squared head engaging the sides of the socket which has a certain amount of resiliency owing to the longitudinally extending slit 9 in the said socket.

The method of using the hook is as follows: When a boat is about to effect a landing the operator stands at the bow of the boat, holding the pole or handle 12 to which the hook having secured thereto a line or rope is attached, and as soon as the boat is in proper position the operator reaches out with the pole or handle and engages the hook around a piling or similar projection on the dock and then detaching the pole or handle, draws the line taut and makes the free end fast to the boat. With the first line out to hold the boat in position the other lines can be made fast in the usual manner if necessary.

This hook is best adapted to use on boats of moderate tonnage as it eliminates delays in making landings, for under the old method of getting the first lines fast much time was frequently lost by fire-boats, river boats, and crafts of such character in trying to effect a landing after getting in proper position alongside the dock, for unless a line can be promptly made fast the boat is soon blown or drifts out of position and the master or operator is then compelled to maneuver his boat into the proper position which causes great delay. The detachable handle or pole of this hook may be of any desired length or size to fit the necessities of the case in which it is used, as also may the size and strength of the hooks themselves be varied in like manner. The protective cap 15 of the squared end of the pole or handle 12 prevents the sloping sides of the squared end of the said handle from being worn by constant use.

From the foregoing description of the construction of my improved device the manner of applying the same to use and the operation thereof will be readily understood and it will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to within the scope of the appended claims without departing from the spirit or sacrificing any of the principles of the invention.

I claim as my invention:

1. A device of the character described comprising a hook, a resilient socket on said hook, and a handle detachably secured in said socket.

2. A device of the character described comprising a hook, a resilient socket on said hook, and a handle having a wedge-shaped end adapted to frictionally engage said socket.

3. A device of the character described comprising a hook, a rectangular shaped longitudinally split socket on said hook, and a handle having a squared end with sloping sides adapted to frictionally engage said socket.

4. A device of the character described comprising a semi-circular hook having a plurality of teeth on its inner surface, a ring adapted to receive a rope at one end of said hook, a resilient socket on said hook, and a handle having a wedge-shaped end adapted to frictionally engage said socket.

5. A device of the character described comprising a semi-circular hook having a plurality of teeth on its inner surface, an extension on one end of said hook, a rope attaching the ring on the outer end of said extension, a rectangular-shaped longitudinally split socket on said hook, fastening means for securing both the extension and socket to said hook, and a handle having a squared end with sloping sides adapted to frictionally engage said socket.

6. A device of the character described comprising a semi-circular hook having one end turned outwardly and the other inwardly, a plurality of teeth on the inner surface of said hook, an angular extension on the inner surface of said hook held adjacent the inturned end thereof and projecting inwardly therefrom, a rope attaching ring in the outer end of said extension, a rectangular longitudinally split socket on the outer surface of said hook held adjacent said inturned end, fastening means adapted to secure said extension, hook, and socket together, a handle having a squared end with sloping sides, and a metallic cap for the said end of the handle.

In testimony whereof I have hereunto set my hand in presence of two subscribing witnesses.

HARRY A. SYMES.

Witnesses:
WM. E. BECKETT,
A. E. COOPER.

Copies of this patent may be obtained for five cents each, by addressing the "Commissioner of Patents, Washington, D. C."